United States Patent
Jang (10) Patent No.: US 11,169,759 B2
(45) Date of Patent: Nov. 9, 2021

(54) METHOD, APPARATUS, AND RECORDING MEDIUM FOR CONTROLLING DIGITAL SIGNAGE

(71) Applicant: LG ELECTRONICS INC., Seoul (KR)

(72) Inventor: Juhwan Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/754,733

(22) PCT Filed: Jul. 10, 2018

(86) PCT No.: PCT/KR2018/007796
§ 371 (c)(1),
(2) Date: Apr. 8, 2020

(87) PCT Pub. No.: WO2019/093617
PCT Pub. Date: May 16, 2019

(65) Prior Publication Data
US 2020/0310732 A1    Oct. 1, 2020

Related U.S. Application Data

(60) Provisional application No. 62/583,488, filed on Nov. 8, 2017.

(30) Foreign Application Priority Data

Jul. 2, 2018  (KR) .................. 10-2018-0076421

(51) Int. Cl.
*G06F 3/14* (2006.01)
*G09F 9/302* (2006.01)
(Continued)

(52) U.S. Cl.
CPC .............. *G06F 3/14* (2013.01); *G06F 3/0486* (2013.01); *G06F 3/04842* (2013.01);
(Continued)

(58) Field of Classification Search
None
See application file for complete search history.

(56) References Cited

U.S. PATENT DOCUMENTS

2014/0067549 A1   3/2014  Park et al.
2014/0214629 A1   7/2014  Azam et al.
(Continued)

FOREIGN PATENT DOCUMENTS

EP          1300020         4/2003

OTHER PUBLICATIONS

PCT International Application No. PCT/KR2018/007796, International Search Report dated Oct. 10, 2018, 19 pages.
(Continued)

*Primary Examiner* — Edward Martello
(74) *Attorney, Agent, or Firm* — Lee, Hong, Degerman, Kang & Waimey (57) ABSTRACT

An apparatus for controlling digital signage according to an embodiment of the present invention includes a memory, a display, and a controller. The controller selects a background graphic image to which a virtual digital signage is installed with reference to the memory, selects at least one of the number or size of the virtual digital signage with reference to the memory, designates a specific location, in the selected background graphic image, in which the virtual digital signage is installed with reference to the memory, and selects a source video which is displayed through the virtual digital signage in the specific location with reference to the memory.

8 Claims, 10 Drawing Sheets

(51) Int. Cl.
*G06F 3/0484* (2013.01)
*G06F 3/0486* (2013.01)
*G09F 19/22* (2006.01)

(52) U.S. Cl.
CPC .......... *G06F 3/04845* (2013.01); *G09F 9/302* (2013.01); *G09F 19/22* (2013.01)

(56) References Cited

U.S. PATENT DOCUMENTS

| | | |
|---|---|---|
| 2015/0170556 A1 | 6/2015 | Birch et al. |
| 2016/0026253 A1 | 1/2016 | Bradski et al. |
| 2016/0203643 A1 | 7/2016 | Kim et al. |
| 2017/0186232 A1 | 6/2017 | Dange |
| 2017/0278289 A1* | 9/2017 | Marino ................... G06T 11/60 |

OTHER PUBLICATIONS

European Patent Office Application Serial No. 18875576.3, Search Report dated Jun. 30, 2021, 7 pages.

* cited by examiner

| | Icon | How to use | Description |
|---|---|---|---|
| 1310 | 🖼 | | Insert image into selected display. |
| 1320 | ▷ | | Insert moving pictures into selected display. |
| 1330 | YouTube | Left Click | Insert YouTube video (URL) into selected display. |
| 1340 | ⊞ | | Split the display screen of more than 75 inches |
| 1350 | ◇ | | Snapped Display Group |
| 1360 | ◢ | | Length information of the selected display |
| 1370 | 🗑 | | Delete the selected display |

FIG. 14

METHOD, APPARATUS, AND RECORDING MEDIUM FOR CONTROLLING DIGITAL SIGNAGE

CROSS-REFERENCE TO RELATED APPLICATIONS

This application is the National Stage filing under 35 U.S.C. 371 of International Application No. PCT/KR2018/007796, filed on Jul. 10, 2018, which claims the benefit of U.S. Provisional Application No. 62/583,488, filed on Nov. 8, 2017, and also claims the benefit of earlier filing date and right of priority to Korean Application No. 10-2018-0076421, filed on Jul. 2, 2018, the contents of which are all hereby incorporated by reference herein in their entirety.

TECHNICAL FIELD

The present disclosure relates to a technology for controlling a digital signage, and is applicable to a mobile device, a TV, a tablet PC, a desktop PC, and the like

BACKGROUND ART

Digital signage has been mainly installed in well-populated public places such as airports, elevators, subway stations, and the like. Recently, digital signage has been installed in fast food stores for a variety of reasons. The types of digital signage include outdoor door digital signage and indoor digital signage.

An outdoor digital signage means a digital signage installed on a building outer wall, an electric signboard, or the like. The waterproof-processed large LCD TV outputs a moving picture advertisement or real-time news similar to a TV C. Typically, it is connected to the PC of the central control center through Internet, and the PC transmits an advertisement replacement command and the like. Thus, there is a limit that interactive communication is difficult.

On the other hand, an indoor digital signage is installed on an inner wall of a large shopping mall or in the form of a standing signboard. Although there is a mini version that reduces only the size of the outdoor digital signage, there is an advantage that it is possible to communicate with a user in an active communication with the user by employing a touchscreen-type kiosk.

Yet, since the indoor digital signage costs considerable expense for its installation as well as the outdoor digital signage, it is virtually impossible to move after installation once.

However, according to the related art, a solution, which can pre-test whether there is any effect after installing digital signage in a random place. Therefore, there is a problem that a person must directly perform the task of physically moving the position after installation.

DETAILED DESCRIPTION OF THE DISCLOSURE

Technical Task

The present disclosure is intended to solve the above problem and other problems. One technical task of the present disclosure is to provide a solution foe predicting an effect in advance when digital signage is installed in a corresponding place without installing the digital signage physically in direct.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present disclosure, provided herein is a method of controlling a digital signage, the method including selecting a background graphic image for installing a virtual digital signage therein, selecting at least one of a number or size of the virtual digital signage, designating a specific position for installing the virtual digital signage within the selected background graphic image, and selecting a source video to display through the virtual digital signage at the specific position.

The designating may further include determining an attribute of the background graphic image of the designated specific position and determining whether the specific position is a position appropriate for installing a real digital signage as a result of the attribute determination.

The may further include if the specific position is determined as the position appropriate for installing the real digital signage, controlling the virtual digital signage to be displayed at the specific position within the background graphic image and if the specific position is not determined as the position appropriate for installing the real digital signage, controlling the virtual digital signage to be displayed at a position different from the specific position within the background graphic image.

And, the selecting the source video may include providing a different source list depending on whether it is an internet-accessible state.

In another technical aspect of the present disclosure, provided herein is an apparatus for controlling a digital signage, the apparatus including a memory, a display; and a controller, wherein the controller may be configured to select a background graphic image for installing a virtual digital signage therein by referring to the memory, select at least one of a number or size of the virtual digital signage by referring to the memory, designate a specific position for installing the virtual digital signage within the selected background graphic image by referring to the memory, and select a source video to display through the virtual digital signage at the specific position by referring to the memory. And, the apparatus is related to at least one of a mobile device, a Personal Computer (PC) or a Television (TV).

Advantageous Effects

According to one embodiment of the present disclosure, it is technically advantageous in providing a solution foe predicting an effect in advance when digital signage is installed in a corresponding place without installing the digital signage physically in direct.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

And, FIG. 14 is a time-series flowchart showing a method for implementing one embodiment of the present disclosure.

BEST MODE FOR DISCLOSURE

Description will now be given in detail according to exemplary embodiments disclosed herein, with reference to the accompanying drawings. In general, a suffix such as "module" and "unit" may be used to refer to elements or components. Use of such a suffix herein is merely intended to facilitate description of the specification, and the suffix itself is not intended to give any special meaning or function.

Figure 1:
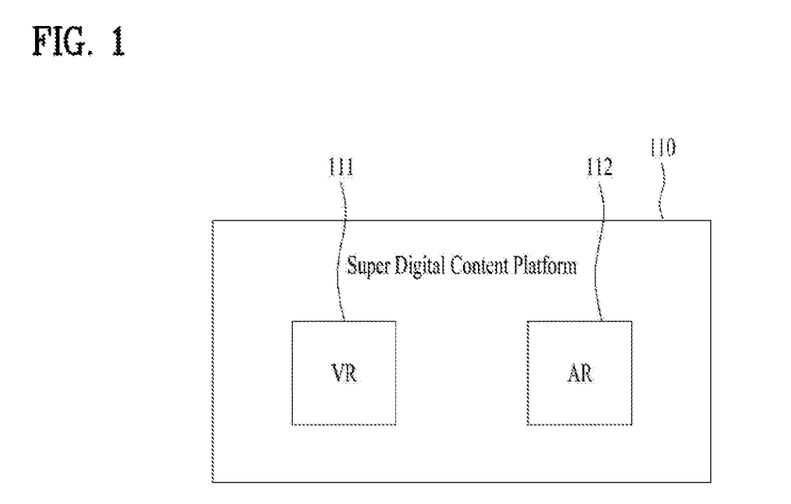
FIG. 1 is a diagram providing two basic tools for controlling digital signage according to one embodiment of the present disclosure.

FIG. 1 is a diagram providing two basic tools for controlling digital signage according to one embodiment of the present disclosure.

Data (e.g., computer programs, etc.) for controlling digital signage according to one embodiment of the present disclosure are stored in one memory of at least one of a mobile device, a PCs or a TV. Of course, downloading related data online and through websites falls within the scope of the present disclosure.

In addition, a device 110 according to one embodiment of the present disclosure individually provides a VR mode 111 and an AR mode 112.

The VR mode 111, for example, means selecting an image pre-stored in a memory of the device according to one embodiment of the present disclosure as a background image. In this regard, it will be described in detail with reference to FIG. 2.

On the other hand, the AR mode 112 means selecting an image newly captured by a user through another camera, mobile device or the like as a background image instead of using an image pre-stored in the memory of the device 110 according to one embodiment of the present disclosure. In this regard, it will be described in detail with reference to FIG. 11.

Figure 2:
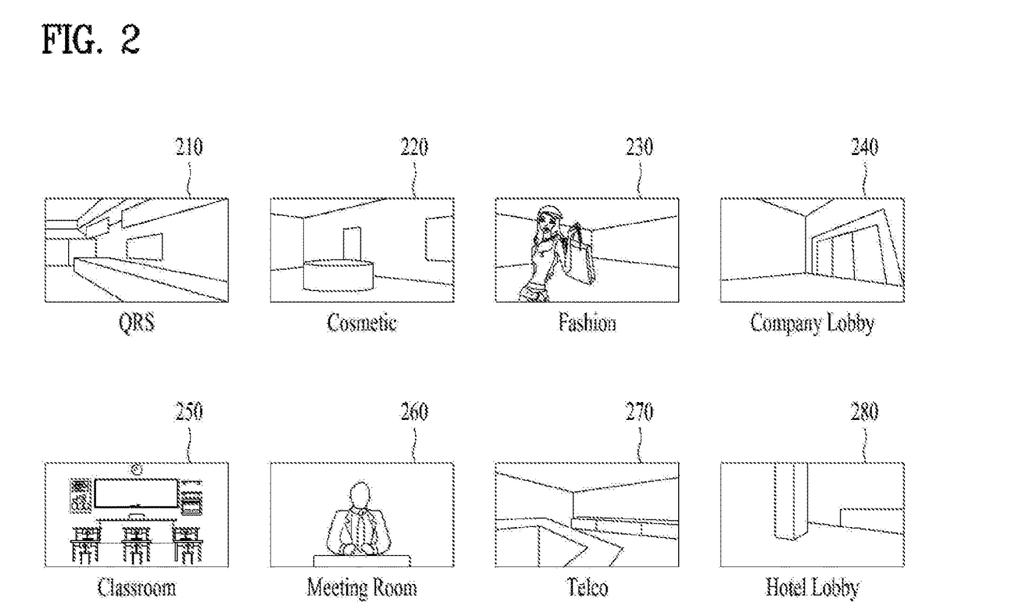
FIG. 2 is a diagram showing an example of a multitude of background images provided in the VR mode shown in FIG. 1.

FIG. 2 is a diagram showing an example of a multitude of background images provided in the VR mode shown in FIG. 1.

Referring to FIG. 2, if the VR mode shown in FIG. 1 is selected, a list of background images for testing installation of a virtual digital signage is outputted. As described above, the background image in the VR mode is not a photo directly captured by a user but is designed to be pre-downloaded as a corresponding background image per representative location through a server and the like.

In FIG. 2, as the background images for installing a virtual digital signage, a restaurant (Quick Service Restaurant) 210, a cosmetic store (Cosmetic) 220, a fashion store (Fashion) 230, a company lobby 240, a school (Classroom) 250, a meeting room 260, a telecommunication company (Telco) 270, a hotel lobby 280 and the like are shown, which are just exemplary. Providing more or less background images falls within the scope of the preset disclosure.

Figure 3:
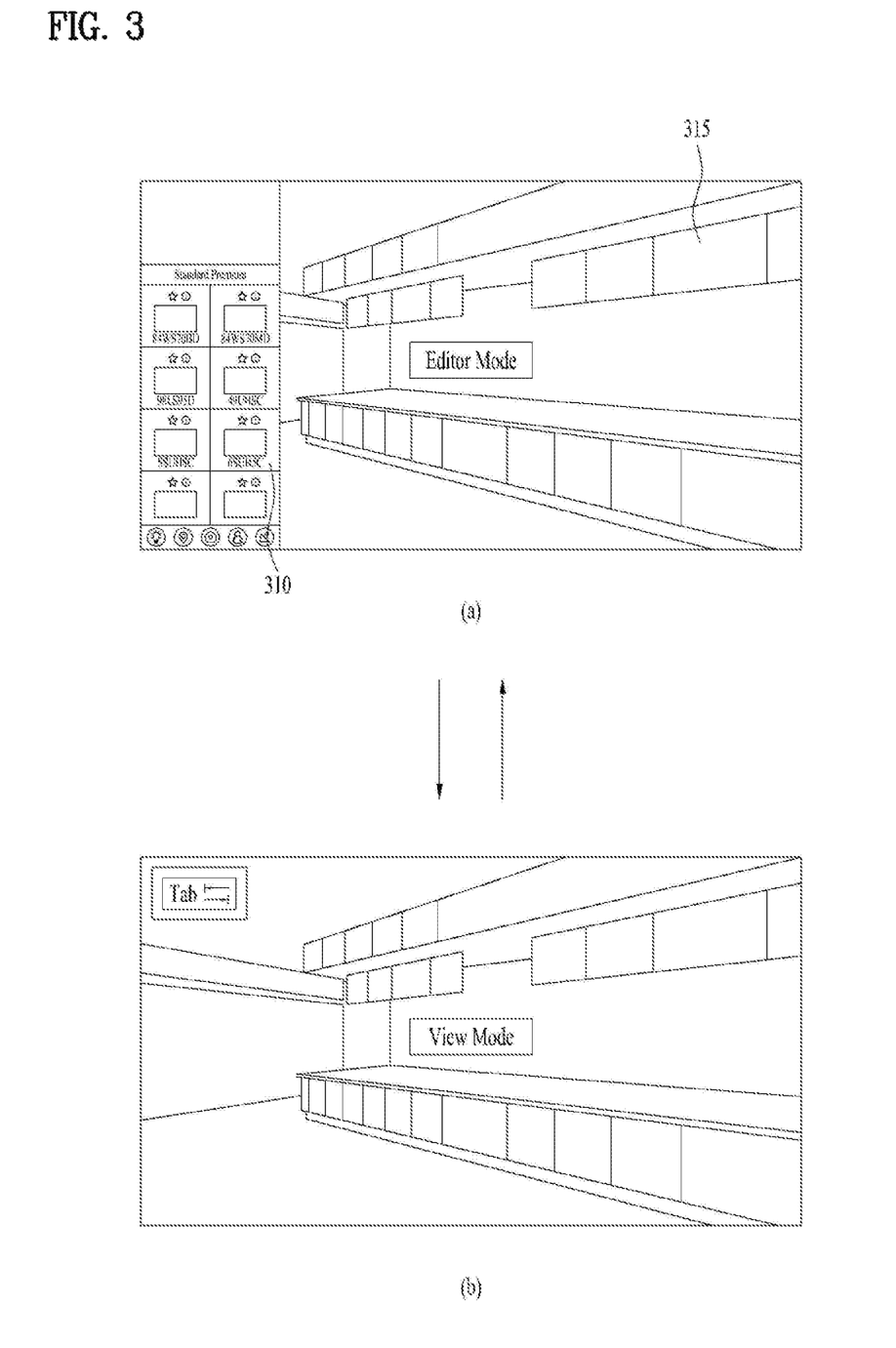
FIG. 3 is a diagram showing examples of an editor mode and a view mode provided in the VR mode shown in FIG. 1.

FIG. 3 is a diagram showing examples of an editor mode and a view mode provided in the VR mode shown in FIG. 1.

While a VR mode is enabled, if an editor mode is selected, as shown in FIG. 3(a), a list of selectable virtual digital signages is outputted and a location candidate 315 for locating them is highlighted. The highlight has the advantage in inducing a user's selection. Of course, virtually installing the virtual digital signage in a place other than the highlighted location candidate 315 falls within the scope of the present disclosure.

If the editor mode is completed, as shown in FIG. 3(b), it is switched to a view mode and the virtual digital signage selected by the user is displayed at a specific location (by user selection or automatically). Yet, if the user does not like it after confirmation, it needs to be quickly switched to the previous editor mode. Hence, an option 320 for switching to the editor mode in the course of the view mode is displayed as well. Hence, quick mode switching is available advantageously.

Figure 4:
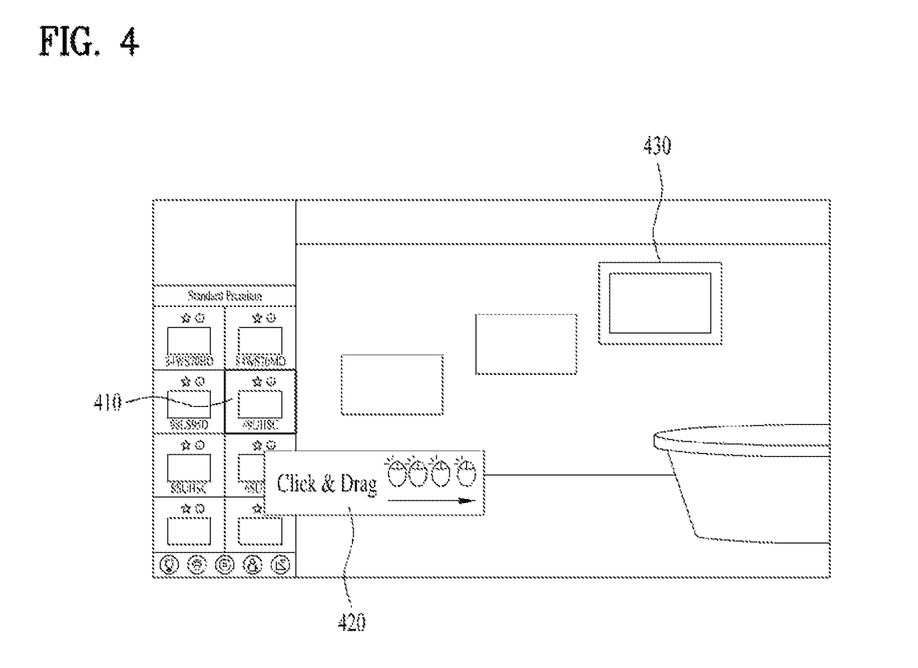
FIG. 4 is a diagram showing a process for moving virtual digital signage selected in the VR mode shown in FIG. 1 to a random position in a background image.

FIG. 4 is a diagram showing a process for moving virtual digital signage selected in the VR mode shown in FIG. 1 to a random position in a background image.

As described above, the user having selected the virtual digital signage to output to the background image should determine whether to display the selected specific virtual digital signage at a prescribed position in the background image.

For example, as shown in FIG. 4, if the specific virtual digital signage 410 selected by the user is dragged to the background image while selected (clicked), the virtual digital signage is moved to a specific position 430. According to this design, the inconvenience due to user's selection can be reduced. Of course, the virtual digital signage 410 can be moved to a random position desired by the user within the background image.

Figure 5:
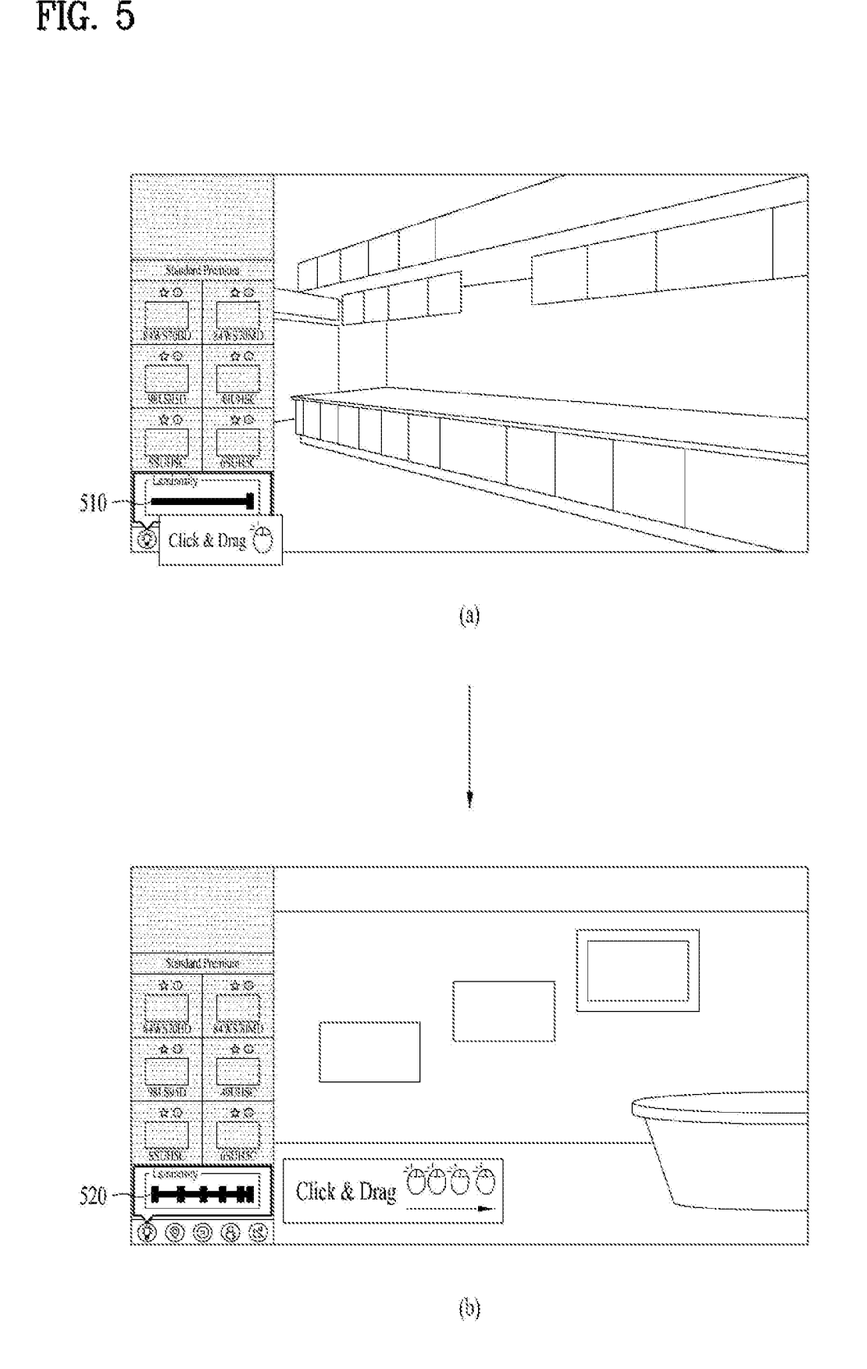
FIG. 5 is a diagram showing a process for changing lighting of a background image selected in the VR mode shown in FIG. 1.

FIG. 5 is a diagram showing a process for changing lighting of a background image selected in the VR mode shown in FIG. 1.

If a real digital signage is installed at a specific physical location, it is highly probable that the digital signage will be displayed continuously day and night. And, a specific user may want to increase an advertisement effect in a specific time slot (e.g., day or night) at least. Therefore, a function of adjusting the lighting of the background image and the like is necessary.

As shown in FIG. 5(a), a user selects a background image and a virtual digital signage to be displayed at a specific position and an option 510 for adjusting lighting is then provided 510.

Subsequently, as shown in FIG. 5(b), illumination may be adjusted in a manner of clicking/dragging the option 520. FIG. 5(b) shows an example of a state that the illumination is dimmed.

Figure 6:
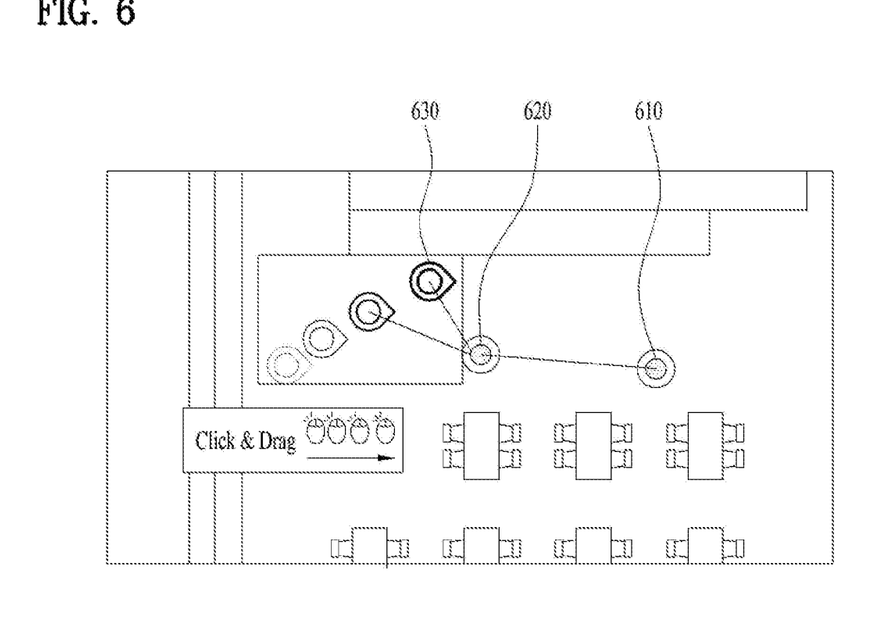
FIG. 6 is a diagram showing a process for setting a moving route in the VR mode shown in FIG. 1.

FIG. 6 is a diagram showing a process for setting a moving route in the VR mode shown in FIG. 1.

If a real digital signage is installed at a specific location, random users do not view the digital signage in a fixed state all the time. Furthermore, it may frequently happen that a plurality of digital signages are installed in a large place. Therefore, there is a need for a solution for pretesting how a digital signage will be viewed in a real space in a manner of predicting a moving route of a random user.

First of all, as described with reference to FIGS. 1 to 5, assume that a background image, a specific digital signage, a location for display, a lighting level and the like are set.

Referring to FIG. 6, if moving routes 610, 620 and 630 of a random user are set, a program having the present disclosure applied thereto is executed accordingly. Hence, instead of displaying a virtual digital signage within a fixed background image only, a scenario that a random user observes a virtual digital signage in various directions while moving virtually may be pretested advantageously. Of course, there are a technical effect of outputting an image of a different digital signage at the same location by selecting a direction for each of the routes 610, 620 and 630, a technical effect of outputting an image of the same digital signage at a different angle, and the like.

Figure 7:
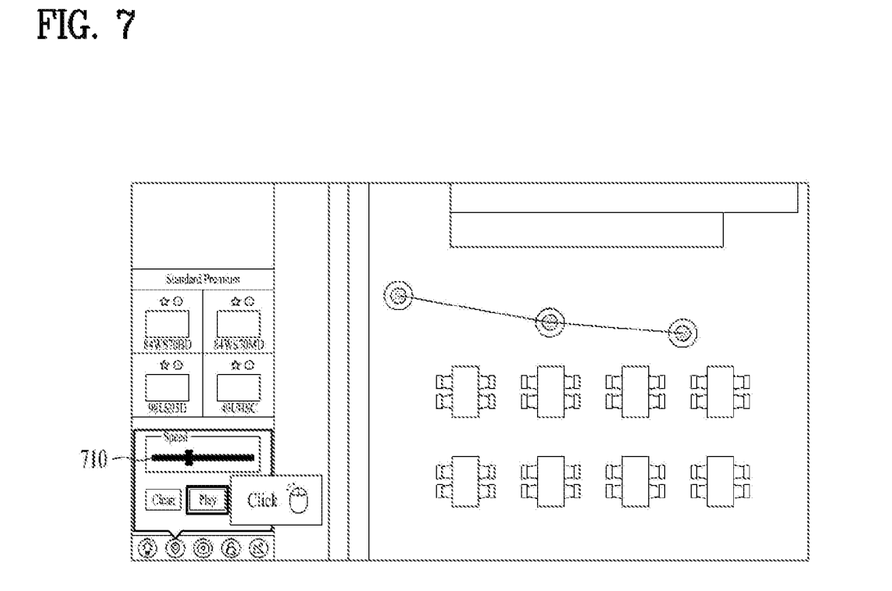
FIG. 7 is a diagram showing a process for setting a speed of the moving route set in FIG. 6.

FIG. 7 is a diagram showing a process for setting a speed of the moving route set in FIG. 6.

The embodiment of setting a moving route is described with reference to FIG. 6. And, an embodiment of setting a speed of the moving route set in FIG. 6 is described with reference to FIG. 7. It is possible to estimate age brackets, sexes and the like of users mainly staying in a place where a real digital signage is installed. Based on such data, it is also possible to estimate a moving speed of a user in the place where the real digital signage is installed.

Accordingly, as shown in FIG. 7, an option 710 for adjusting a speed of a moving route is provided as well. Of course, although FIG. 7 shows an example that a user sets a moving speed in direct, extracting a moving speed within a virtual digital signage installed background image automatically in a manner that a user simply inputs an age bracket or ages of target users falls within the scope of the present disclosure.

Figure 8:
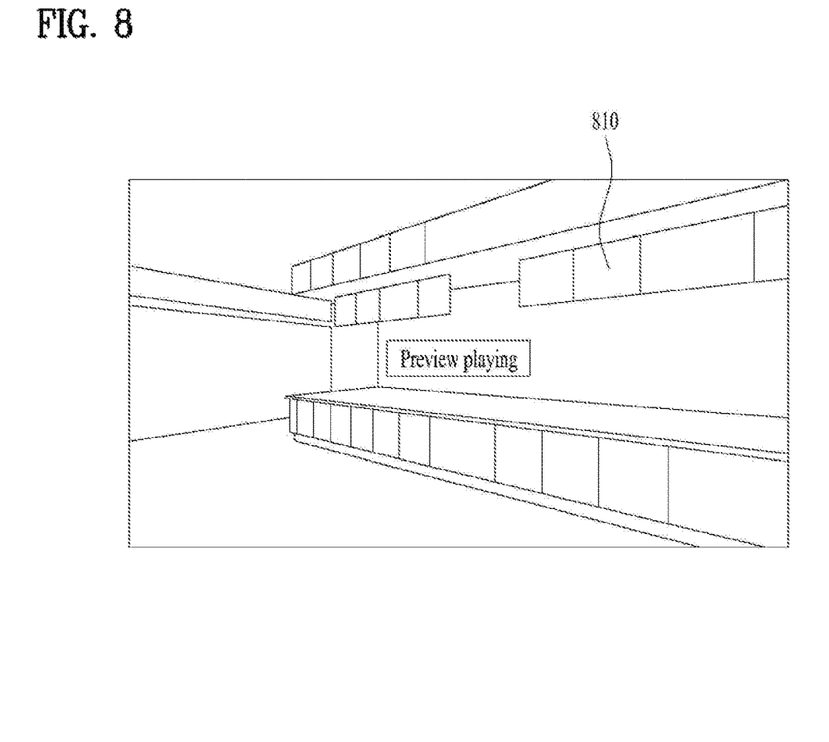
FIG. 8 is a diagram showing an image outputted from a virtual digital signage in the VR mode shown in FIG. 1.

FIG. 8 is a diagram showing an image outputted from a virtual digital signage in the VR mode shown in FIG. 1.

As described with reference to the foregoing drawings, if the settings of a background image, a virtual digital signage and location, a moving route, a speed and the like are completed, as shown in FIG. 8, a device according to one embodiment of the present disclosure provides a video based on the setting-completed data. Namely, the video shows a digital signage 810 viewed by a random user who is moving in the background image. Yet, as it is difficult to check a size difference between the random user and the virtual digital signage, it is necessary to pretest a difference between a real digital signage and a real person by making a random user appear in the video. This will be described with reference to FIG. 9 as follows.

Figure 9:
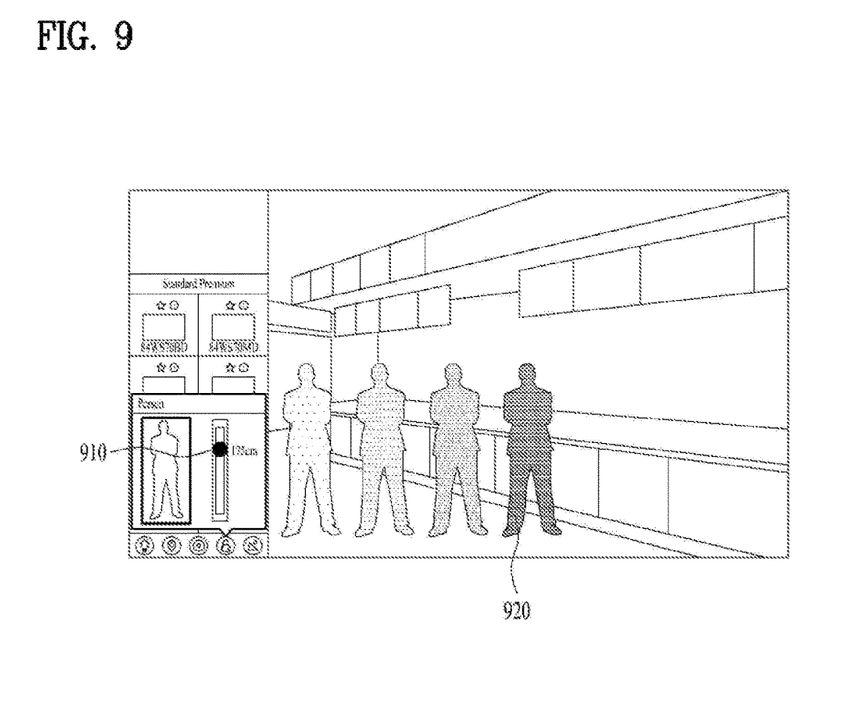
FIG. 9 is a diagram showing a process for adjusting a size of a virtual user in the VR mode shown in FIG. 1.

FIG. 9 is a diagram showing a process for adjusting a size of a virtual user in the VR mode shown in FIG. 1.

Referring to FIG. 9, an option 910 for selecting a size of a user to be inserted in a background image containing a virtual digital signage is provided, and a size of a virtual user 920 in the background image is changeable correspondingly under the control of the option.

Figure 10:
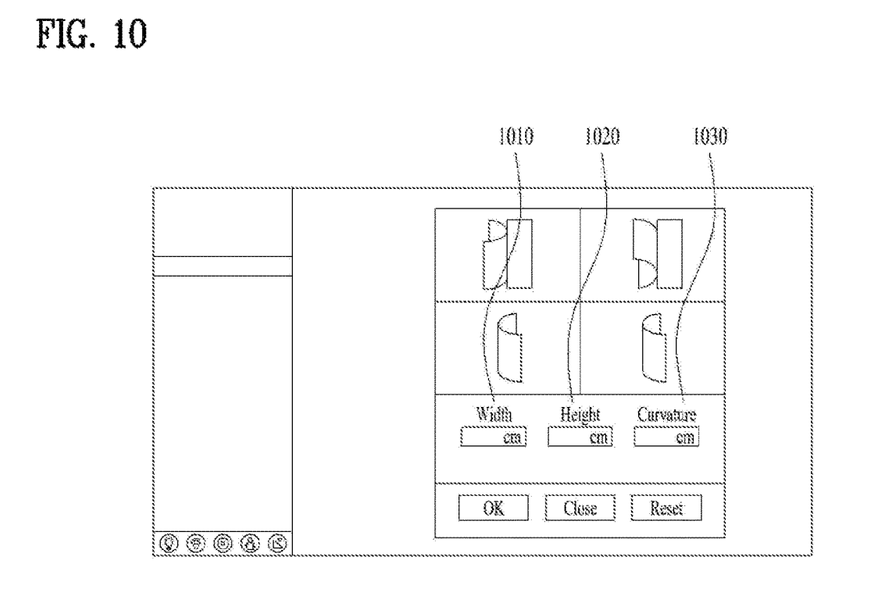
FIG. 10 is a diagram showing a process for setting a width, height or curvature of a virtual digital signage in the VR mode shown in FIG. 1.

FIG. 10 is a diagram showing a process for setting a width, height or curvature of a virtual digital signage in the VR mode shown in FIG. 1.

Recently, owing to the development of TV technology and the like, TVs and signage products capable of flexible display appear. Hence, referring to FIG. 10, an option for enabling a user to directly select a width 1010, a height 1020 and a curvature 1030 of a virtual digital signage is provided. It may be necessary to pre-obtain such information on a digital signage which is to be installed actually, by which the present disclosure is non-limited. On the contrary, after selecting the information 1010, 1020 and 1030 by changing the information randomly, selecting a width, height and curvature of an actually installed physical digital signage falls within the scope of the present disclosure.

Figure 11:
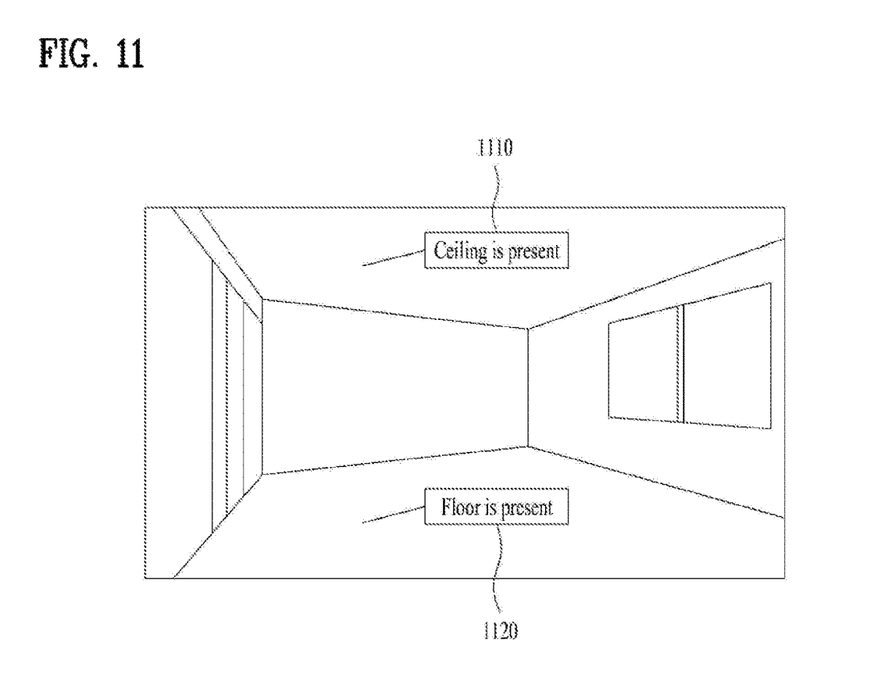
FIG. 11 is a diagram showing a process for extracting an attribute of a background image captured by a user in the AR mode shown in FIG. 1.

FIG. 11 is a diagram showing a process for extracting an attribute of a background image captured by a user in the AR mode shown in FIG. 1.

So far, the VR mode is described with reference to FIGS. 1 to 10. And, FIG. 11 relates to an AR mode. Yet, applying the embodiments for the VR mode in FIGS. 1 to 10 to the AR mode shown in FIG. 11 falls within the scope of the present disclosure. To emphasize the description again, the VR mode is to install a virtual digital signage on a background image, which is provided by a device and pre-stored in a memory. Regarding the AR mode, a user directly captures a location of a place where a real digital signage will be installed, and then uses it as a background image.

Referring to FIG. 11, if a user captures a place (e.g., room), in which a real digital signage will be installed, using a camera, the captures image is usable as a background image. In the AR mode, unlike the previous VR mode, a step of analyzing an object of a background image randomly captured by a user may be performed in addition.

For example, specific objects 1110 and 1120 in a photo randomly captured by a user are recognized as a ceiling and a floor. Furthermore, it is impossible to install a digital signage on these objects actually. Hence, in case that a user places a virtual digital signage at the position of the object 1110 or 1120, a feedback effect indicating that installation is impossible is generated so that the user can be guided to place the virtual digital signage in a correct place.

Figure 12:
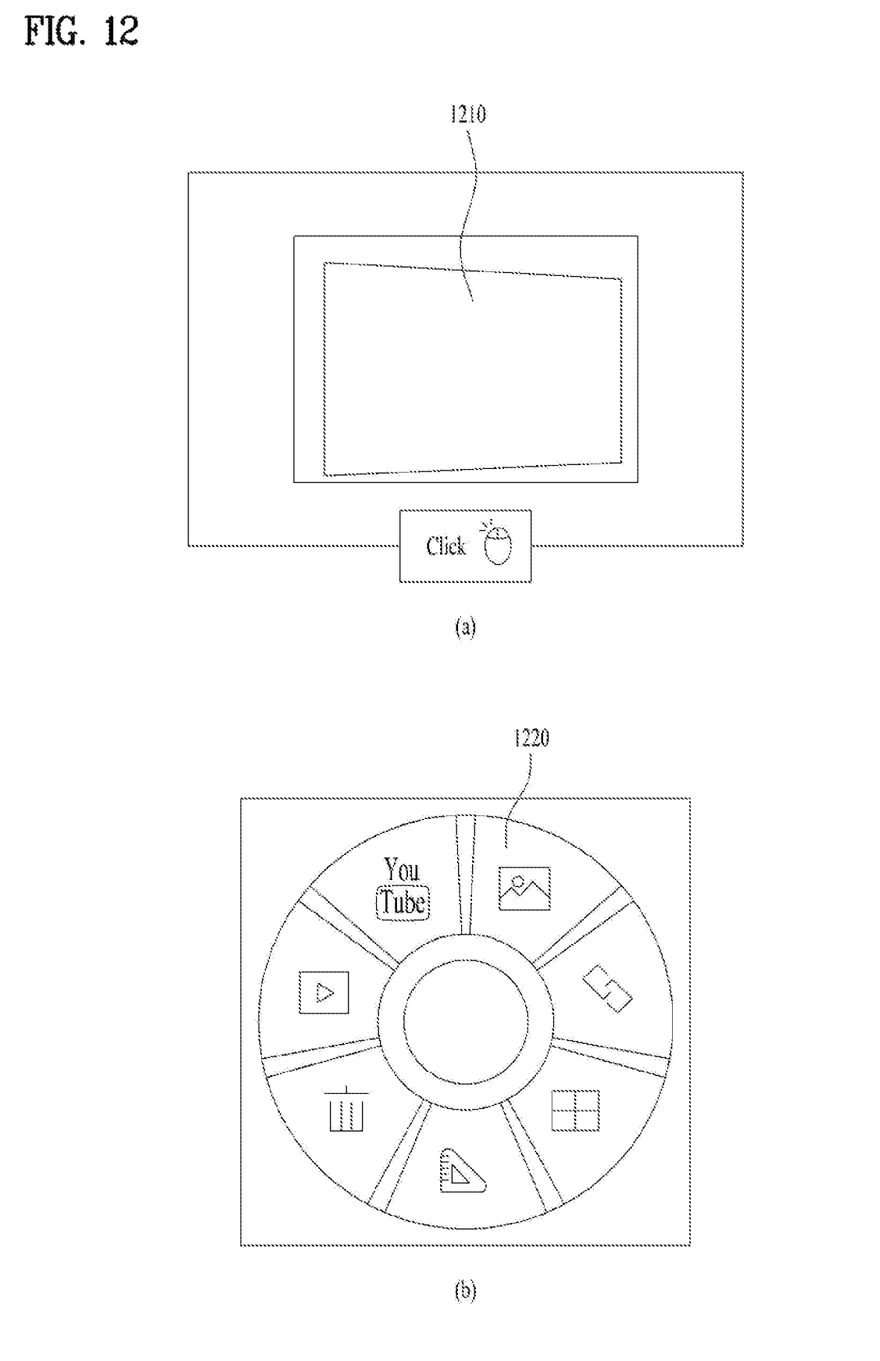
FIG. 12 and FIG. 13 are diagrams showing a process for selecting a video source outputted from a virtual digital signage in the VR/AR mode shown in FIG. 1.
Figure 13:
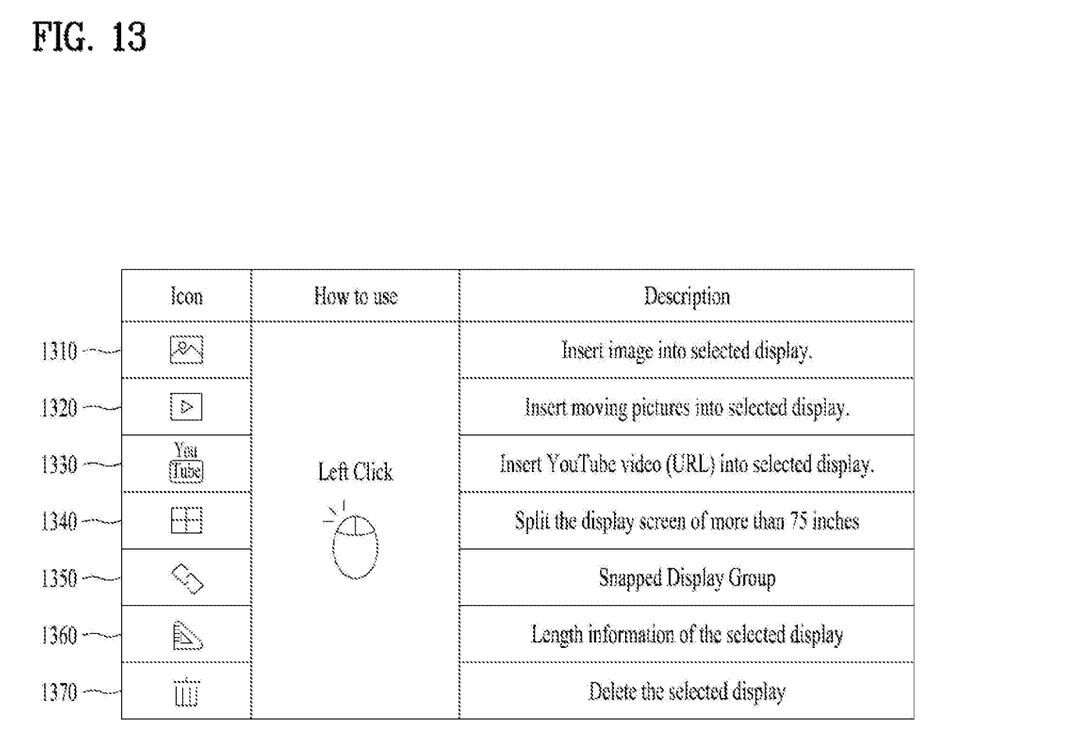

FIG. 12 and FIG. 13 are diagrams showing a process for selecting a video source outputted from a virtual digital signage in the VR/AR mode shown in FIG. 1.

If a digital signage existing actually and physically is installed in a random place, an installer's intention is to output a prescribed video and the like on the digital signage through the installed digital signage. Therefore, a tool for experiencing a state of outputting a prescribed video to a real digital signage in a virtual space in advance is required necessarily.

FIG. 12 and FIG. 13 are applicable to both of the VR mode and the AR mode, which falls within the scope of the present disclosure.

If a virtual digital signage 1210 in a background image is selected (e.g., clicking a button of a mouse) [FIG. 12(a)], a video list 1220 to output through the virtual digital signage is displayed [FIG. 12(b)]. Particularly, depending on whether a device of the present disclosure for installing a virtual digital signage is connected to Internet or the like, YouTube video items are designed to be contained in the list 1220 or not, which falls within the scope of the present disclosure. The list shown in FIG. 12 will be described in detail with reference to FIG. 13 later.

A first icon 1310 contained in the list 1220 of FIG. 12 is used when a video source to be outputted to the selected specific digital signage 1210 is a still image.

A second icon 1320 contained in the list 1220 of FIG. 12 is used when a video source to be outputted to the selected specific digital signage 1210 is a moving image.

A third icon 1330 contained in the list 1220 of FIG. 12 is used when a video source to be outputted to the selected specific digital signage 1210 is found through YouTube.

A fourth icon 1340 contained in the list 1220 of FIG. 12 is used when three are a plurality of video sources to be outputted to the selected specific digital signage 1210. Particularly, this item is activated only if a size of the digital signage is 75 inches at least, which falls within the scope of the present disclosure.

A fifth icon 1350 contained in the list 1220 of FIG. 12 is used when a video source outputted to the selected specific digital signage 1210 is the same as outputted to another digital signage.

A sixth icon 1360 contained in the list 1220 of FIG. 12 is used when basic information (e.g., width, height, curvature, etc.) of the selected specific signage 1210 is checked.

A seventh icon 1370 contained in the list 1220 of FIG. 12 is used to delete the selected specific signage 1210.

Figure 14:
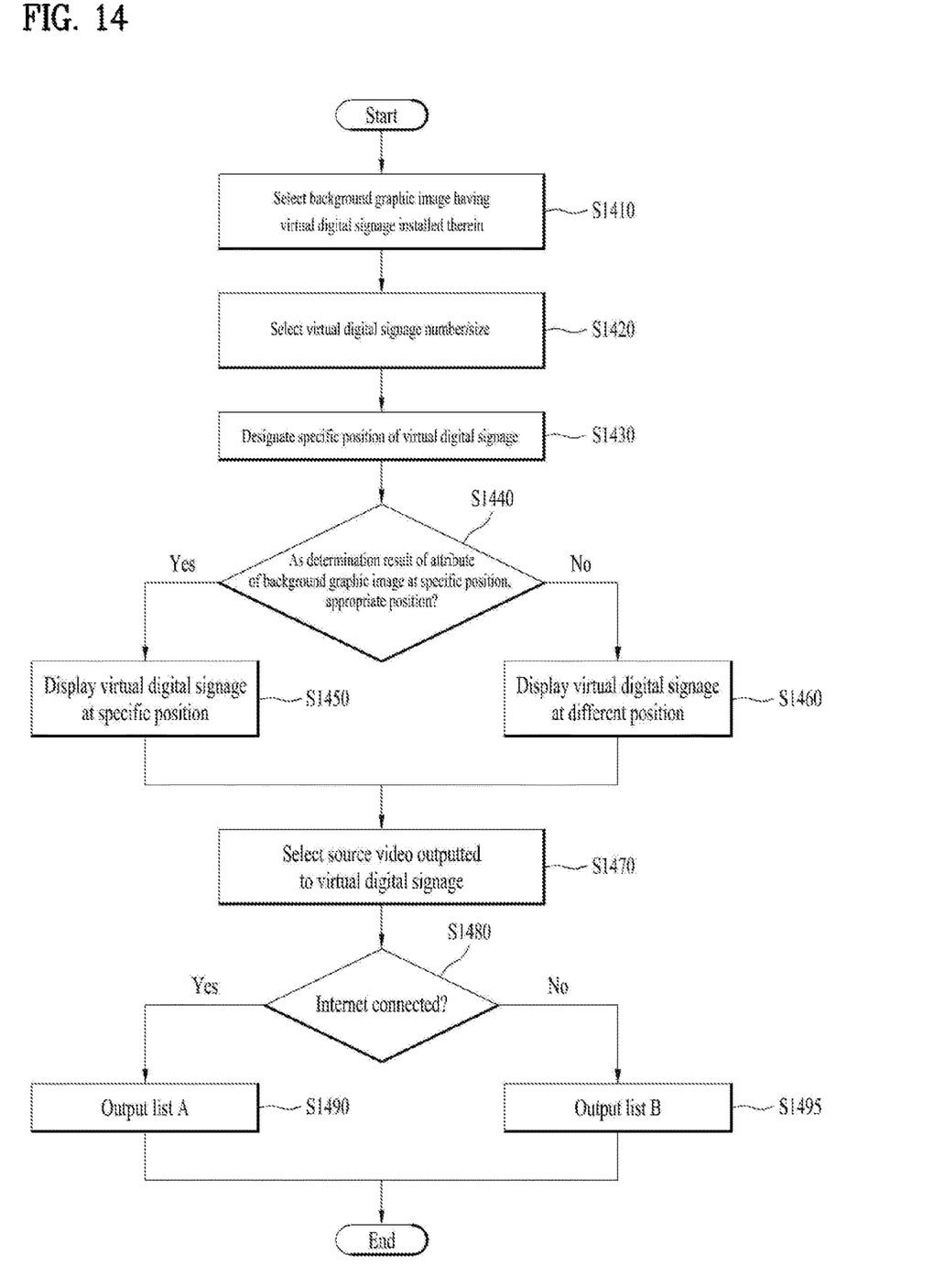

Finally, FIG. 14 is a time-series flowchart showing a method for implementing one embodiment of the present disclosure.

According to one embodiment of the present disclosure, a background image in which a virtual digital signage will be installed is selected [S1410], and at least one of the number and size of the virtual digital signage is selected [S1420].

Furthermore, within the selected background graphic image, a specific location at which the virtual digital signage will be installed is designated [S1430].

An attribute of the background graphic image of the designated specific position is determined. As a result of the attribute determination, it is determined whether the specific position is a position appropriate for installing a real digital signage [S1440].

If the specific position is determined as the position appropriate for installing the real digital signage, the virtual digital signage is controlled to be displayed at the specific position within the background graphic image [S1450].

On the contrary, if the specific position not is determined as the position appropriate for installing the real digital signage, the virtual digital signage is controlled to be displayed at a position other than the specific position within the background graphic image [S1460].

Subsequently, a source video to be displayed through the virtual digital signage at the specific position is selected [S1470].

The step S1470 is characterized in providing a different source list depending on whether it is an internet accessible state. This is described above with reference to FIG. 12 and FIG. 13.

A recording medium readable by a computer storing a program for executing the steps shown in FIG. 14 entirely or in part falls within the scope of the present disclosure, which is downloadable online or through website and the like.

If the aforementioned method of FIG. 14 is implemented in a device, an apparatus for controlling a digital signage according to one embodiment of the present disclosure includes a memory, a display and a controller. Particularly, the controller implements the embodiments shown in FIGS. 1 to 13 and further implements the steps of FIG. 14 entirely or in part.

For example, the controller is characterized in selecting a background graphic image for installing a virtual digital signage therein by referring to the memory, selecting at least one of a number or size of the virtual digital signage by referring to the memory, designating a specific position for installing the virtual digital signage within the selected background graphic image by referring to the memory, and selecting a source video to display through the virtual digital signage at the specific position.

The controller is characterized in determining an attribute of the background graphic image of the designated specific position for example and determining whether the specific position is a position appropriate for installing a real digital signage as a result of the attribute determination.

For example, if the specific position is determined as the position appropriate for installing the real digital signage, the controller is characterized in controlling the virtual digital signage to be displayed at the specific position within the background graphic image. If the specific position is not determined as the position appropriate for installing the real digital signage, the controller is characterized in controlling the virtual digital signage to be displayed at a position different from the specific position within the background graphic image.

For example, the controller is characterized in providing a different source list depending on whether it is an internet-accessible state by controlling the display.

And, the apparatus for implementing the above process corresponds to at least one of a mobile device, a PC or a TV for example.

It will be appreciated by those skilled in the art that various modifications and variations can be made in the present disclosure without departing from the spirit or scope of the disclosures.

Thus, the foregoing embodiments are merely exemplary and are not to be considered as limiting the present disclosure. And, it is intended that the present disclosure covers the modifications and variations of this disclosure provided they come within the scope of the appended claims and their equivalents.

MODE FOR DISCLOSURE

In Best MODE FOR DISCLOSURE, various embodiments for implementing the present disclosure are described.

INDUSTRIAL APPLICABILITY

The present disclosure relates to the technology for controlling a digital signage and is applicable to various devices to have industrial applicability.

What is claimed is:

1. A method of controlling a virtual digital signage, the method comprising:
  selecting a background graphic image for installing a virtual digital signage therein;
  selecting at least one of a number or size of the virtual digital signage;
  designating a specific position for installing the virtual digital signage within the selected background graphic image;
  providing a source list comprising one or more sources of content for display within the virtual digital signage, wherein the source list is provided differently depending on availability of an internet connection of a device for controlling the virtual digital signage;

selecting a specific source video within the source list; and displaying content from the selected specific source video within the virtual digital signage at the specific position within the background graphic image.

2. The method of claim 1, the designating, further comprising:

determining an attribute of the background graphic image of the designated specific position; and determining whether the specific position is a position appropriate for installing a real digital signage as a result of the attribute determination.

3. The method of claim 2, further comprising:

when the specific position is determined as the position appropriate for installing the real digital signage, displaying the virtual digital signage at the specific position within the background graphic image; and when the specific position is not determined as the position appropriate for installing the real digital signage, displaying the virtual digital signage at a position different from the specific position within the background graphic image.

4. A non-transitory recording medium readable by a computer storing instructions for executing the steps disclosed in claim 1.

5. An apparatus for controlling a virtual digital signage, the apparatus comprising:

a memory;

a display; and a controller configured to:

select a background graphic image for installing a virtual digital signage therein by referring to the memory, select at least one of a number or size of the virtual digital signage by referring to the memory, designate a specific position for installing the virtual digital signage within the selected background graphic image by referring to the memory, provide a source list comprising one or more sources of content for display within the virtual digital signage, wherein the source list is provided differently depending on an internet connection of the apparatus, select a specific source video within the source list, and display on the display content from the selected specific source video within the virtual digital signage at the specific position within the background graphic image.

6. The apparatus of claim 5, wherein the controller is further configured to:

determine an attribute of the background graphic image of the designated specific position, and determine whether the specific position is a position appropriate for installing a real digital signage as a result of the attribute determination.

7. The apparatus of claim 6, wherein the controller is further configured to:

when the specific position is determined as the position appropriate for installing the real digital signage, control the display to display the virtual digital signage at the specific position within the background graphic image; and wherein when the specific position is not determined as the position appropriate for installing the real digital signage, control the display to display the virtual digital signage at a position different from the specific position within the background graphic image.

8. The apparatus of claim 5, wherein the apparatus is related to at least one of a mobile device, a PC or a TV.

\* \* \* \* \*